Patented Apr. 5, 1927.

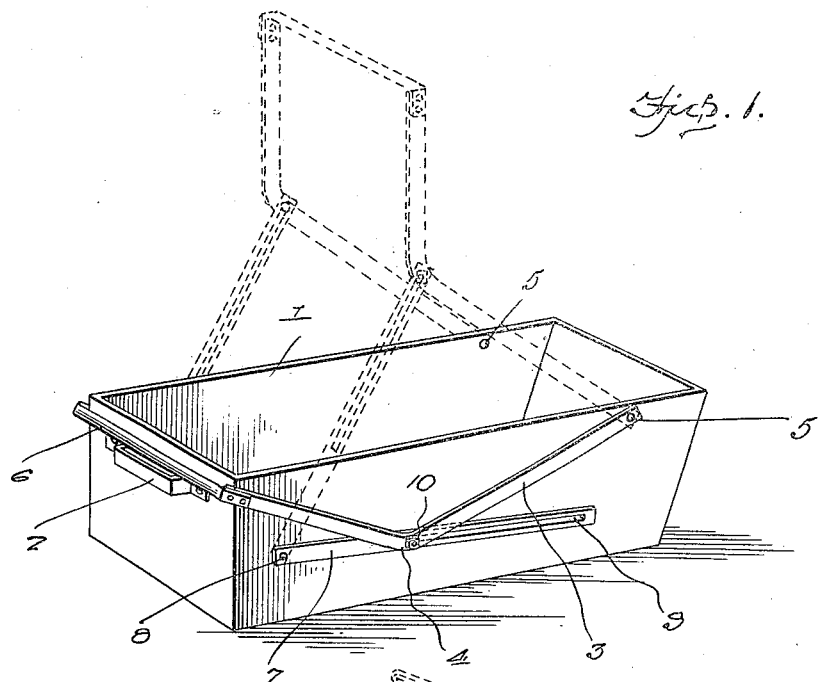
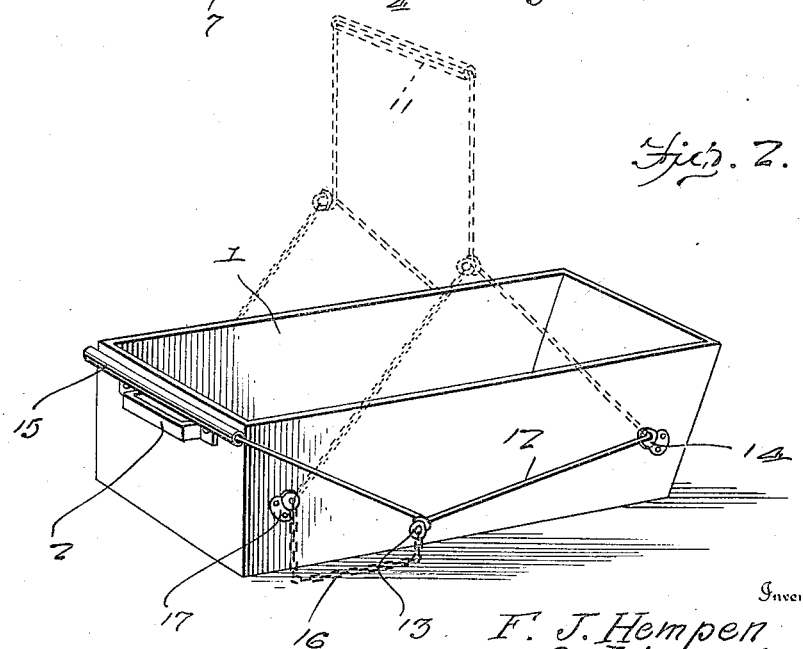

1,623,409

UNITED STATES PATENT OFFICE.

FRED JOHN HEMPEN AND OSCAR LIPSMEIER, OF AVISTON, ILLINOIS.

RECEPTACLE AND HANDLE THEREFOR.

Application filed January 25, 1926. Serial No. 83,621.

This invention relates to a highly novel yet simple handle construction for receptacles, wherein the handle is pivotally associated with the receptacle, means being associated with the receptacle and the pivoted handle for limiting the swinging movement of the handle in one direction, whereby the receptacle will be held in a substantially horizontal position against tilting movement while the receptacle is being carried.

One of the important objects of the present invention is to provide a handle which is readily and easily actuated for disposing the same in a carrying position, the handle being normally swung downwardly below the top of the receptacle.

A further object is to provide a receptacle and a pivoted handle therefor, the receptacle being particularly adapted for use as an ash pan, the rear end of the ash pan having a rigid handle formed thereon and on which the handle portion of the pivoted bail for the receptacle is adapted to rest when the ash pan is disposed beneath the fire box of a stove or furnace so that the pivoted bail will not drag on the bottom of the fire box or floor, and furthermore enable the handle portion of the bail to be readily grasped after the ash pan has been removed from the stove in order to facilitate the carrying of the ash pan, there being provided cooperating means between the pivoted bail and the receptacle for maintaining the ash pan in a horizontal position so that there will be no possibility of the ashes being accidentally spilled, or dumped, during the carrying of the receptacle.

A still further object is to provide a handle for receptacles, which is simple in construction, inexpensive, strong, and durable, and further well adapted for the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a perspective view of an ash pan illustrating one form of a handle construction therefor, the handle being shown in its normal position, and Figure 2 is a similar view of another form of a handle.

In the drawing wherein for the purpose of illlustration is shown the preferred embodiment of our invention, with reference more particularly to Figure 1, the numeral 1 designates generally a receptacle which is of such shape as to be particularly adapted for use as an ash pan for stoves and furnaces. The usual stationary handle which is attached to the rear end of the ash pan is indicated at 2, and the same is preferably located at a point adjacent the upper edge of the open top receptacle. Our improved bail includes an elongated flat bar 3, which is bent at a point intermediate its ends as illustrated at 4 for a purpose to be presently apparent. A pair of such bars are provided, the forward ends thereof being pivotally secured to the respective sides of the ash pan or receptacle 1, at a point adjacent the upper edge of the forward end of the receptacle as is clearly illustrated at 5.

The rear free ends of these bars extend beyond the rear end of the receptacle, and are secured together by the cross member 6 whereby a bail is formed. This cross member is formed of tubular material, and the ends thereof are flattened and secured to the respective rear ends of the side bars as clearly illustrated in the drawing and the cross member provides a handle for the bail in grasping and actuating the same.

A pair of slotted bars also form a part of the present invention, and one of each of the slotted bars which is illustrated at 7 is pivotally secured at its rear end to the intermediate portion of each side of the receptacle at a point adjacent the rear end thereof as at 8. The forward end of each of the last mentioned bars is provided with a longitudinally extending slot 9. The bars 3 and 7 are arranged on the respective sides of the ash pan so as to position the slotted bars between the outer faces of the sides of the receptacle and the respective bars 3, as is obvious from the construction shown more clearly in Figure 1.

A bolt 10 or any other similar member extends transversely through each of the angularly formed bars 3 at the bend 4 thereof and each of these bolts cooperate in the longitudinally extending slots 9 of the respective bars 7 whereby an operative connection between the bail and the slotted bars is provided.

When the ash pan is in position in the stove or furnace, the bail is disposed in the position shown in Figure 1, and it is readily seen that when in its normal position, the bail is disposed entirely below the upper edges of the open top receptacle, the handle portion 6 resting on the stationary handle 2 so that there will be no possibility of either the free ends of the slotted bars 7 or the intermediate bent portions of the bars 3 coming in contact with the floor. It is also seen that the bolts 10 which are carried by the elongated bar 3 are disposed in the rear end of the respective slots 9.

In order to facilitate the carrying of the ash pan after the same has been removed from the stove or furnace, by grasping the handle 2 and pulling the pan outwardly, the handle portion 6 of the bail is swung upwardly and during the upward swinging movement of the bail, the slotted bars 7 will also be swung upwardly on their pivots so that when the bail is in the position shown in the dotted lines in Figure 1, the bolts 4 will be positioned in the forward ends of the slots 9 in the respective slotted bars 7 and thus the forward swinging movement of the bails is limited, the handle portion of the bail will be disposed directly above the receptacle at a point intermediate the ends thereof so that there will be no possibility of the ash pan when the same is full of ashes being tipped during the carrying of the same, and thus prevent the ashes being dumped or otherwise discharged from the ash pan.

In Figure 2 of the drawing, a modification of the handle or bail for the receptacle is shown wherein the same is formed of a single strand of wire. The wire bail includes an intermediate portion 11, and the parallel spaced elongated arm portions 12. The intermediate portion of each of the arms 12 is so bent as to provide a loop 13 and to further dispose the portion of the arm adjacent the intermediate portion 11 at an angle with respect to the forward free end portion of each arm. The forward free end of each of the arms is bent to provide a hook for engagement with an apertured lug 14 which is secured on the outer face of each side of the ash pan at a point adjacent the forward end thereof so that a pivotal connection between the forward ends of the arms of the piece of wire forming the bail in the modification will be provided.

A piece of tubing such as is shown at 15 is disposed over the intermediate portion 11 of the wire to form the handle portion of the bail so that a person will not injure their hands when grasping the bail and affords rigidity to the bail.

For the purpose of limiting the upward swinging movement of the wire bail so that the receptacle will be maintained in a substantially horizontal level position and thus prevent the accidental tilting of the receptacle and cause the discharge of the contents thereof during the carrying of the receptacle, there is provided a pair of chains. Each chain 16 is secured at its forward end to the looped portion 13 formed at the intermediate portion at each of the arms 12, the rear ends of the chains being secured to apertured lugs 17 similar to the apertured lugs 14. The apertured lugs 17 are also arranged on the outer face of the respective sides of the receptacle at a point adjacent the rear end thereof as clearly shown in Figure 2.

The wire bail is normally disposed in the position as shown in Figure 2, and when in such position the protector tubing 15 which is disposed over the intermediate portion 11 of the wire bail will rest on the stationary handle 2 so that no portion of the arms of the wire bail will come in contact with the ground. It is obvious that by lifting or swinging the pivoted bail upwardly to the position shown in the dotted lines in Figure 2, the chains 16 will be extended and will cooperate in preventing the further swinging movement of the wire bail for the purpose heretofore more fully described.

It will thus be seen from the foregoing description, that a highly novel yet simple bail has been provided for use upon receptacles wherein the receptacle will at all times be maintained in such position during the carrying thereof as to prevent the tilting movement of the receptacle and cause the accidental discharge of the contents of the receptacle therefrom.

A handle construction of the above mentioned character may be manufactured very cheaply, yet be strong and durable and may furthermore be readily and easily attached to any type receptacle without necessitating any material alterations of the latter.

While we have shown the preferred embodiment of our invention, it is to be understood that various changes in the size, shape and arrangement of parts may be resorted to without departing from the spirit of the invention and the scope of the appended claims.

Having thus described the invention, what we claim as new is:—

1. In combination with a receptacle, of a pivoted bail therefor, the latter including parallel arms and an intermediate portion forming a handle, the forward ends of the parallel spaced arms being pivotally secured to the respective sides of the receptacle at a point adjacent the forward end thereof, the intermediate portion of each arm being bent, and cooperating means between the bent portions of the respective arms and the rear portions of the sides of the receptacle for limiting the upward swinging movement of the bail whereby said receptacle will be prevented from tilting while being carried.

2. In combination with a receptacle, a pivoted bail therefor, the latter including parallel arms and an intermediate portion forming a handle, the forward ends of the parallel spaced arms being pivotally secured to the respective sides of the receptacle at a point adjacent the forward end thereof, the intermediate portion of each arm being bent, a pair of slotted bars pivotally secured at their rear ends to the rear portions of the respective sides of the receptacle, and a pin member carried by each arm at the bend thereof, said pin members cooperating with the respective slotted bars for limiting the upward swinging movement of the bail whereby said receptacle will be prevented from tilting while being carried.

In testimony whereof we affix our signatures.

FRED JOHN HEMPEN.
OSCAR LIPSMEIER.